No. 854,817. PATENTED MAY 28, 1907.
B. FORD.
FLEXIBLE ELECTRIC CONNECTION FOR STORAGE BATTERIES.
APPLICATION FILED SEPT. 24, 1904.

Witnesses:

Inventor
Bruce Ford
By Augustus B. Stoughton
Attorney

UNITED STATES PATENT OFFICE.

BRUCE FORD, OF PHILADELPHIA, PENNSYLVANIA.

FLEXIBLE ELECTRIC CONNECTION FOR STORAGE BATTERIES.

No. 854,817.      Specification of Letters Patent.      Patented May 28, 1907.

Application filed September 24, 1904. Serial No. 225,829.

*To all whom it may concern:*

Be it known that I, BRUCE FORD, a citizen of the United States, residing at the city of Philadelphia, in the county of Philadelphia and State of Pennsylvania, have invented certain new and useful Improvements in Flexible Electric Connections for Storage Batteries, &c., of which the following is a specification.

The object of the present invention is to provide an acid proof flexible connection especially well adapted for connecting up the plates of secondary or storage batteries, for example, one cell thereof with another or with a line and also useful for a variety of other purposes.

The invention comprises the improvements to be presently described and finally claimed.

Figure 1:
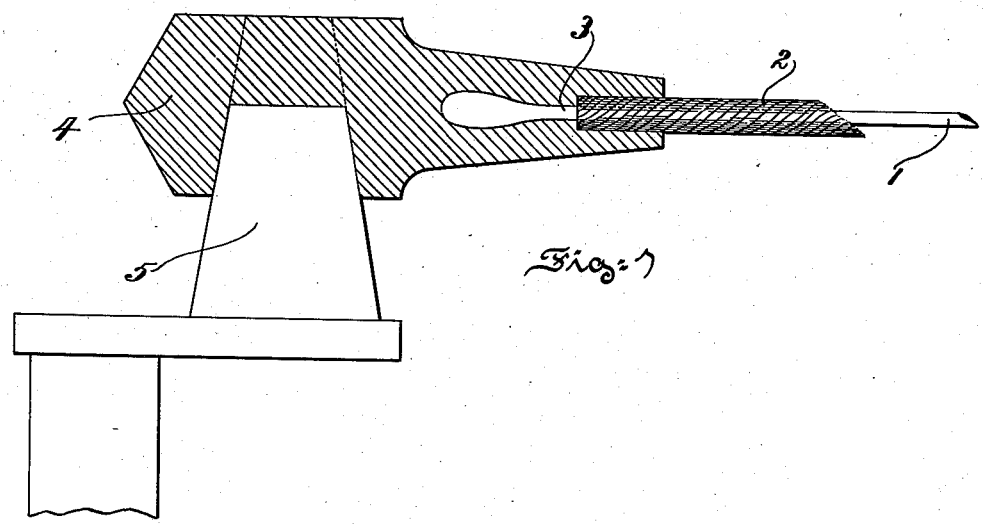
Figure 2:
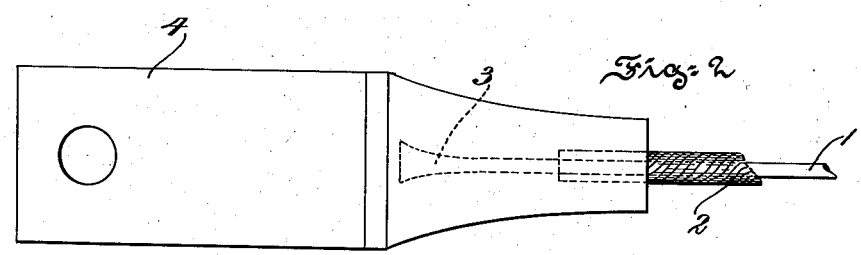
Figure 3:
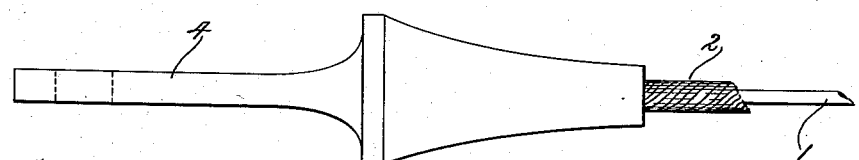

The nature, characteristic features and scope of my invention will be more fully understood from the following description taken in connection with the accompanying drawings forming part hereof and in which Figure 1, is a side view partly in section illustrating a flexible connection embodying features of the invention, and Figs. 2 and 3, are respectively a plan and a side elevation of a flexible connection embodying a modification of the invention.

In the drawings 1, is a flexible conductor or wire having thereon an insulating covering 2, as of rubber or rubber compounds. The end 3, of the wire is bare in the sense that the covering has been removed or stripped therefrom for a short distance and this bare end may be flattened. 4, is a lug having formed within it a socket which contains not only the bare end 3, of the wire 1, but also a portion of the insulating covering. The lug 4, is cast onto the end portion of the wire and also onto the adjacent portion of the covering. In this way there is secured excellent electrical contact between the lug and the bare end of the wire while the contact between the covering and the lug is such that fumes of acid or other corroding vapors may not reach any portion of the wire including of course the bare end 3, thereof. The lug 4, may be provided with an opening for the reception of the terminal 5, of the battery plates and the lug and the terminal may be burned together.

In Fig. 1, there is shown one type of terminal and in Figs. 2 and 3, there is shown in the lug an opening for the reception of a different type of electrical connection.

The lug 4, consists of course of conductive material which is not attacked by the acid or other fumes. Lead or an alloy thereof is an example of such material.

It will be obvious to those skilled in the art to which my invention relates that modifications may be made in detail without departing from the spirit thereof, hence the invention is not limited further than the prior state of the art may require, but

Having thus described the nature and objects of my invention, what I claim as new and desire to secure by Letters Patent is:

1. An acid proof flexible connection comprising a conductor having an insulating cover and an enlarged bare end, and a non-corrosive lug cast onto the enlarged end and adjacent portions of the cover, substantially as described.

2. An acid proof flexible connection comprising a conductor having an insulating cover and a bare end, a non-corrosive lug cast onto the bare end and adjacent portions of the cover, and means for preventing disconnection of said parts, substantially as described.

In testimony whereof I have hereunto signed my name.

BRUCE FORD.

Witnesses:
     GEO. M. HOWARD,
     D. E. MALOY.